Jan. 25, 1955 C. A. BABBITT 2,700,408
METHOD OF FORMING A PIPE
Filed Feb. 18, 1950 5 Sheets-Sheet 3
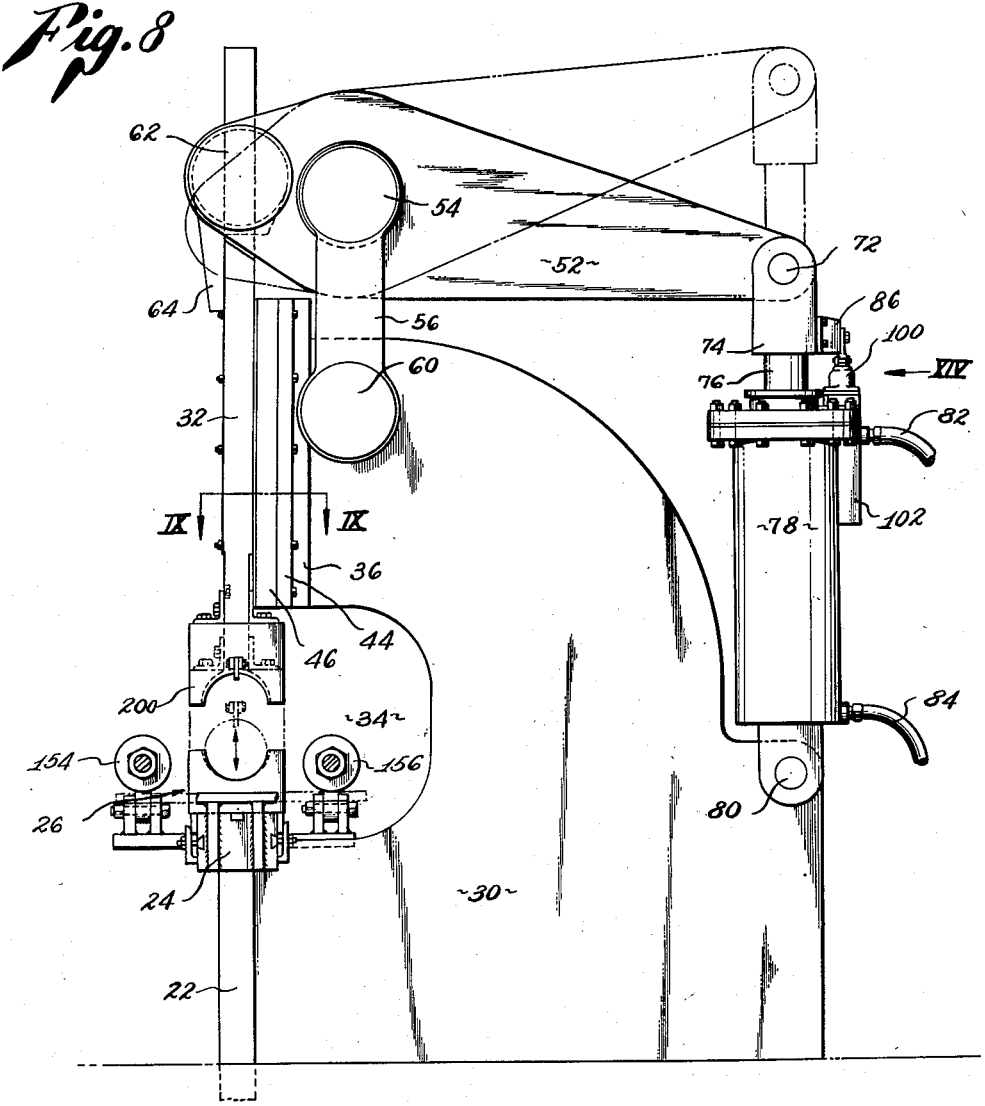
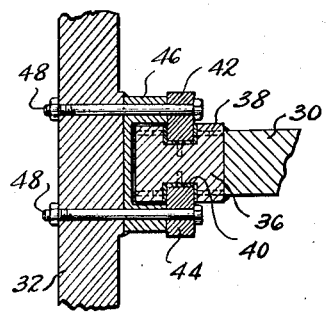
INVENTOR.
CHARLES A. BABBITT
BY Wm Edward Hann
Attorney Jan. 25, 1955
C. A. BABBITT
2,700,408
METHOD OF FORMING A PIPE
Filed Feb. 18, 1950
5 Sheets-Sheet 4
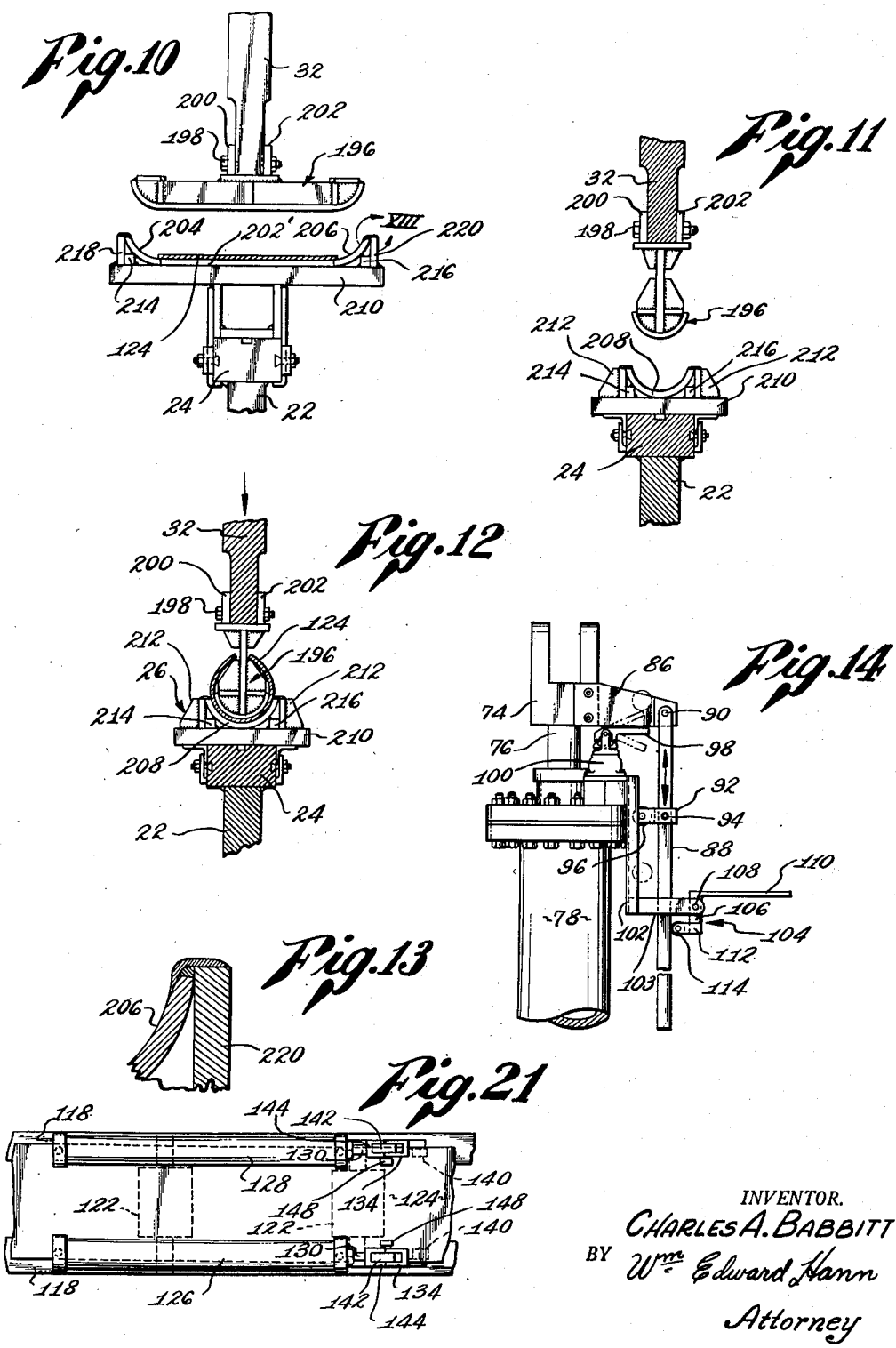
INVENTOR.
CHARLES A. BABBITT
BY Wm Edward Hann
Attorney INVENTOR.
CHARLES A. BABBITT
BY Wm Edward Hann
Attorney

United States Patent Office 2,700,408
Patented Jan. 25, 1955

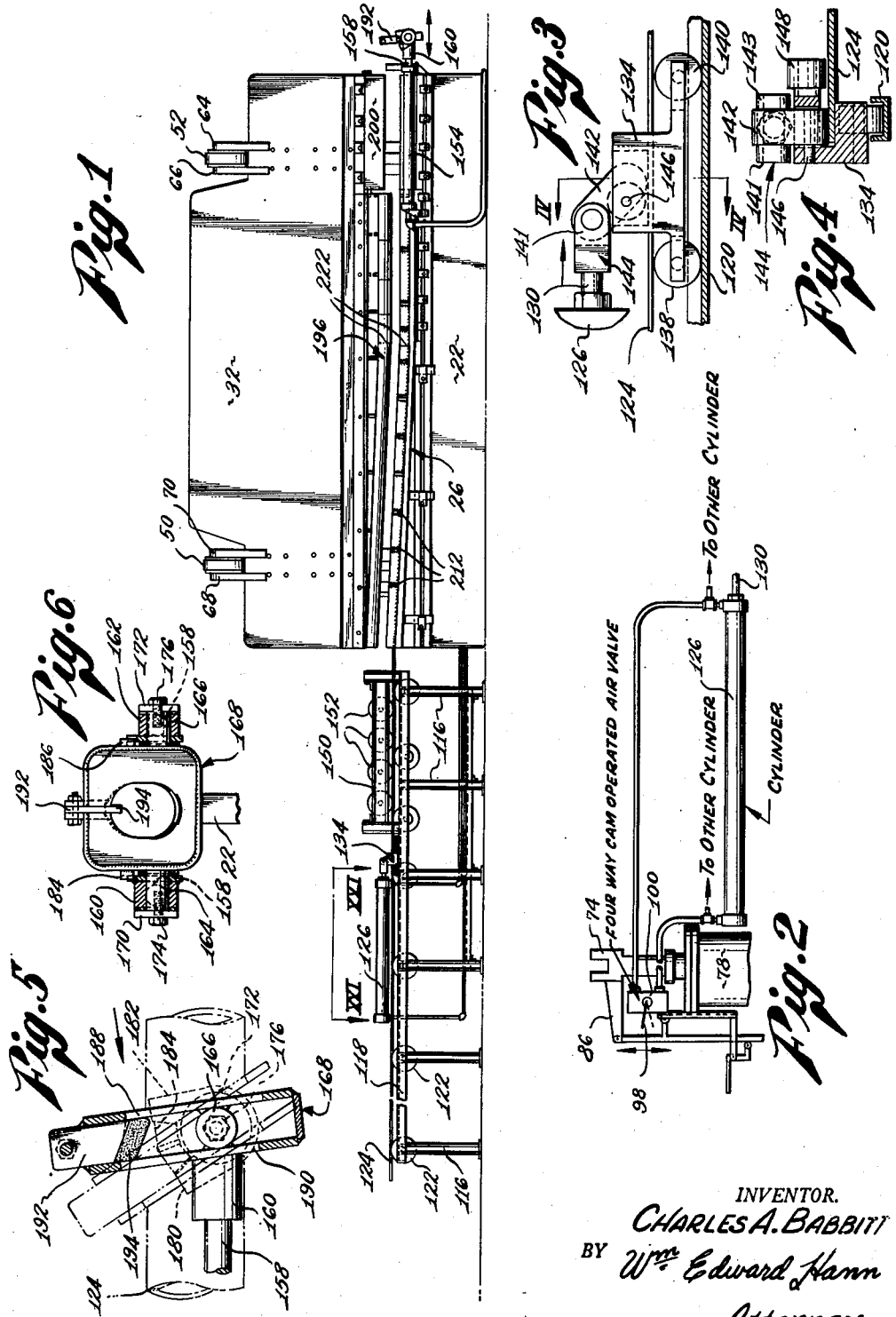

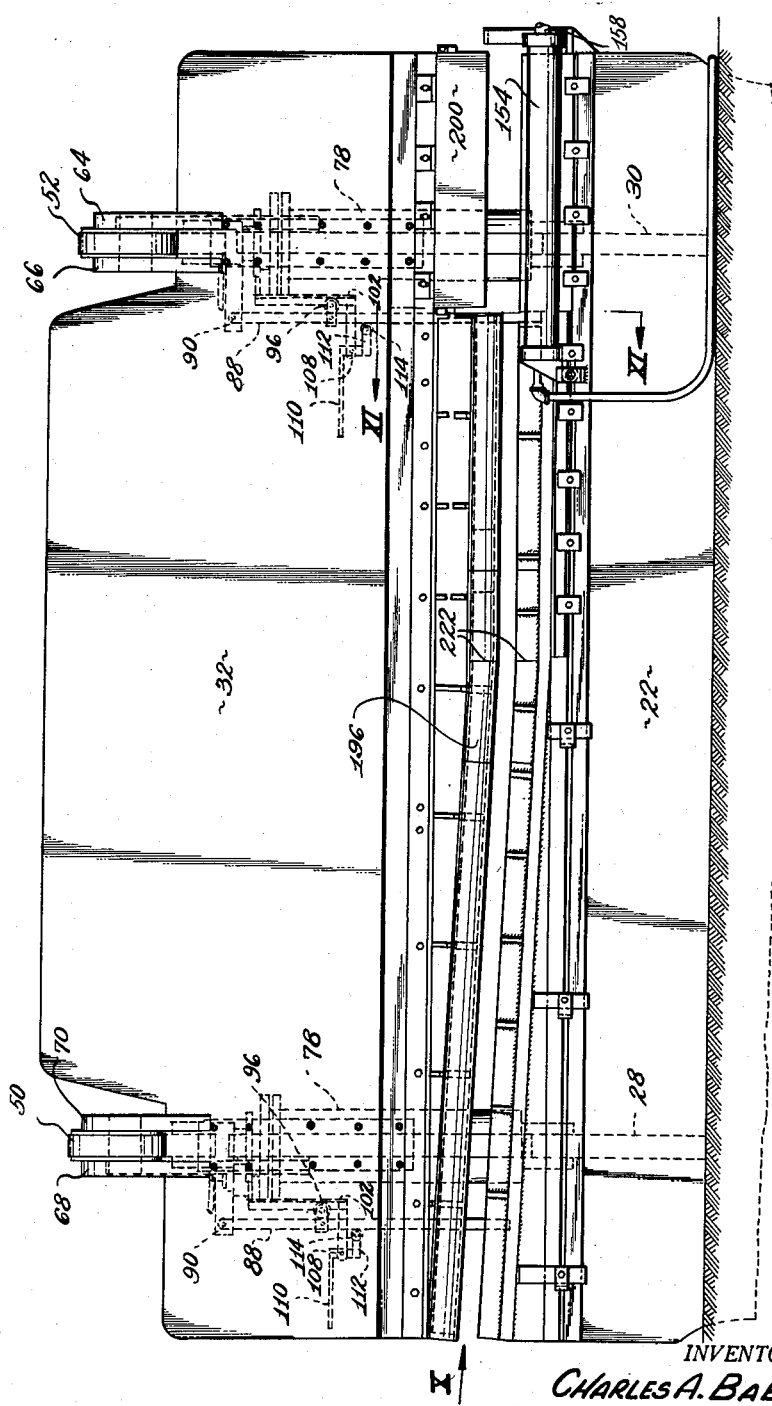

2,700,408

METHOD OF FORMING A PIPE

Charles A. Babbitt, South Gate, Calif., assignor to Cal-Metal Corporation, Torrance, Calif., a corporation of California Application February 18, 1950, Serial No. 144,961

1 Claim. (Cl. 153—49)

This invention relates to a method and means for forming cylindrical pipe from elongated rectangular sheets of steel plate or from a continuous length of sheet stock.

The main objects of this invention are to provide an improved method of forming pipe by subjecting the sheet of work material to the action of a pair of cooperating, elongated, tapered dies which act on the sheet to curve the opposite marginal edges on lines which converge equally with respect to the longitudinal center line of the workpiece and then advance the workpiece in step-by-step increments lengthwise through the dies.

As the sheet of material first enters the dies its opposite marginal edges only are formed to cross-sectional curvature along converging lines and such worked upon portions extend for a portion only of the length of the finished pipe. The dies are then opened and the sheet advanced a suitable increment, whereupon the dies are again closed. At this time the portions formed to cross-sectional curvature are parallel to the portions first formed but are spaced inwardly thereof. These operations are continued until the work sheet is completely curved from end to end into a substantially cylindrical pipe.

Thereafter the longitudinal seam is welded by passing the shaped piece through the continuous welder disclosed and described in my co-pending application Serial No. 79,900, filed March 5, 1949, now Patent No. 2,613,303.

In the present forming machine the stock from which the pipe is formed may be either elongated, rectangular sheets of steel plate or it may be a continuous strip from rolls of ribbon-like sheet steel and the formed pipe severed into suitable lengths either before or after it is welded to close the seam.

The sheet stock, either continuous strip or individual sheets, is fed to the dies by two feeding mechanisms, one located at the entrance end of the dies which pushes the material, and the other located at the opposite end of the dies which grips the substantially cylindrical formed pipe and pulls it. With this arrangement, individual sheets may be fed to the dies and by the time the rear end passes the pusher feed mechanism, the formed end is engaged by the pulling feed mechanism and advances the stock on through the dies.

When operating on continuous strip material from rolls of stock, one feed mechanism aids and supplements the other although, if need be, only the pusher feed mechanism may be used and satisfactory operation secured. Also, if the individual sheets are tacked end to end by welding, then satisfactory operation may be secured by use of the pusher feed mechanism only. Many miles of pipe have been formed on this machine by the use of the last-described arrangement only.

An illustrative embodiment of this invention is shown in the accompanying drawings, in which:

Fig. 1 is a view in side elevation of my improved pipe forming machine and stock feeding mechanisms.

Fig. 2 is a fragmentary and diagrammatic view of one of the feed actuating cylinders with its air pressure piping arrangement.

Fig. 3 is an enlarged fragmentary view showing the details of one of the sheet stock grippers which engage the marginal edges of the material from which the pipe is formed.

Fig. 4 is a sectional view taken on the line IV—IV of Fig. 3 looking in the direction indicated by the arrows and showing one marginal edge of the work sheet being gripped by the push feeder.

Fig. 5 is an enlarged fragmentary sectional view of the pipe gripper of the pull feeder.

Fig. 6 is a view in front elevation of the same.

Fig. 7 is an enlarged side elevational view of the press with the dies mounted thereon and the press in open position.

Fig. 8 is a view in end elevation of the same as viewed from the right-hand end of Fig. 7.

Fig. 9 is an enlarged fragmentary sectional view taken on the line IX—IX of Fig. 8 looking in the direction indicated by the arrows.

Fig. 10 is an enlarged fragmentary view in end elevation showing the front or entering end of the dies mounted in the press, as indicated by the arrow X in Fig. 7.

Fig. 11 is an enlarged, fragmentary, vertical, transverse, sectional view of the same taken on the line XI—XI of Fig. 7, looking in the direction indicated by the arrows.

Fig. 12 is a view similar to Fig. 11 and showing the dies closed on a work sheet.

Fig. 13 is an enlarged fragmentary sectional view showing the detail of the construction of the portion enclosed in the circle marked XIII in Fig. 10.

Fig. 14 is an enlarged fragmentary view in elevation showing the mechanism for operating the valve which controls the flow of pressure air to the feed cylinders.

Fig. 21 is a fragmentary plan view taken on line XXI—XXI of Fig. 1 showing the sheet stock grippers.

Figure 15:
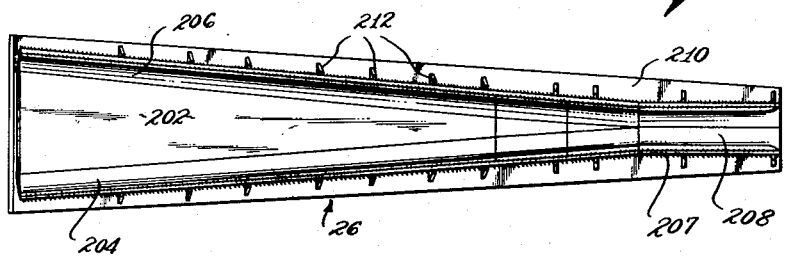
Fig. 15 is a top plan view of the lower or female die.
Figure 16:
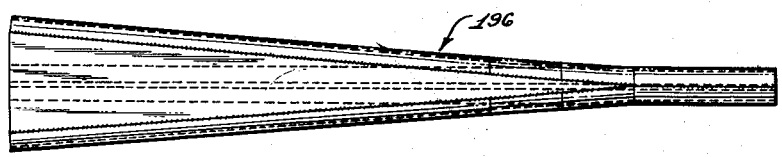
Fig. 16 is a bottom plan view of the upper or male die.

In the construction shown in the drawings, a hydraulic press comprising a horizontally disposed base member 22 has a T-head member 24 rigidly mounted as by welding on the top edge thereof which extends the full length of the base member, for supporting the lower or female die, generally designated 26, on its top side. A pair of vertically disposed, spaced, parallel C-frame members 28 and 30 are rigidly secured as by welding to the members 22 and 24 adjacent the ends thereof for supporting the upper or male die frame or plate 32 and the operating mechanism 34. The C-frames 28 and 30 are substantially identical in construction so that detailed description of one will suffice for both.

As shown most clearly in Fig. 9, the upper end of the C-frame 30 above the throat 34 is provided with a vertically disposed member 36 of substantially rectangular horizontal cross section rigidly mounted thereon as by welding. The opposite sides of the member 36 are provided with vertically extending grooves or ways 38 and 40 in aligned registry, which are lined with suitable bearing material for slidably embracing a pair of inwardly extending, vertically disposed bars 42 and 44 respectively. The bars 42 and 44 are securely mounted on the end faces of the spaced parallel flanges of a channel 46 which is welded to member 32 by a plurality of bolts 48 which extend through the bars, channel flanges and die mounting plate 32.

Means are provided for vertically reciprocating the die mounting plate 32 in its ways and comprise a pair of generally horizontally disposed levers 50 and 52 pivotally mounted on the C-frames 28 and 30 respectively, the levers and mountings therefor being of substantially the same construction so that a detailed description of one will suffice for both. The lever 52 is pivotally mounted intermediate its ends at 54 to and embraced between the upper ends of a pair of vertically disposed links 56 and 58, the lower ends of which embrace opposite sides of and are pivoted to the C-frame 30 at 60.

As viewed in Fig. 8, the left-hand end of the lever 52 is pivoted at 62 between a pair of upstanding lugs or brackets 64 and 66 which are welded in spaced parallel relation to the upper edge of the die mounting plate 32. Similar brackets 68 and 70 are provided for embracing and pivotally mounting the corresponding end of the lever 50.

The opposite end of the lever 52 is pivotally mounted at 72 between the bifurcated ends of a fitting 74 rigidly secured on the outer top end of a vertically disposed piston rod 76 of the hydraulic cylinder 78, the lower end of which is pivotally mounted at 80 on the C-frame 30. Suitable flexible conduits 82 and 84 are provided at the upper and lower ends respectively of the cylinder 78 for the operating pressure fluid in the usual manner of hydraulic presses.

As shown most clearly in Fig. 14 and diagrammatically in Fig. 2, automatic means are provided for operating the feeding mechanism which advances the blanks through the press in step-by-step increments. The fitting 74 has one end of a horizontally extending arm 86 rigidly secured thereto. The other end of the arm 86 has the top end of a vertically disposed cam rod 88 pivoted thereto at 90. The rod 88 is provided with a horizontally disposed bracket 92 adjustably fixed thereon by a set screw 94. The bracket 92 carries a cam roller 96 for actuating the control lever 98 of a 4-way air valve 100 mounted on the head of the cylinder 78 with the lever 98 in the path of travel of the cam roller 96. A depending L-shaped bracket 102 is secured to the head of the cylinder 78 and the horizontal leg 103 of the bracket is bifurcated to slidably embrace the cam rod 88. The outer ends of the bifurcated horizontal leg 103 embrace opposite sides of and pivotally support a gravity lever generally designated 104. The lever 104 comprises a vertically disposed portion 106 which carries the pivot mounting 108, an outwardly extending, horizontally disposed gravity arm 110, and an inwardly extending, horizontally disposed arm 112 on the free end of which is journaled a roller 114. The roller 114 bears against the cam rod 88, the arrangement being such that the cam rod 88 is permitted to have limited swinging or pendulous movement so that after actuating the air valve control lever 98 to the limit of its movement, it may swing outwardly and permit the cam roller 96 to pass by the end of the lever 98. Thereafter the cam rod 88 will swing back under the action of the gravity arm 110 so that the roller 96 will engage and actuate the lever 98 upon return movement of the cam rod 88.

Referring particularly to Figs. 1 and 4, the press is associated with a feed table comprising a series of vertical legs 116 arranged in horizontally spaced relation, the top ends of which are connected by a horizontally disposed angle 118, upon which is carried an upwardly facing channel rail 120. The feed table journals a series of horizontally disposed, spaced, parallel rollers 122 which support the work sheet 124.

Means are provided for advancing the work sheet lengthwise in step-by-step increments and comprise air-actuated cylinders 126 and 128 mounted lengthwise on the feed table at each side thereof. The piston rods 130 and 132 respectively of the cylinders 126 and 128 are connected to carriages 134 and 136 of substantially the same construction so that a detailed description of one will suffice for both.

The carriage 134, as shown most clearly in Figs. 3 and 4, is journaled on rollers 138 and 140 which rest and roll upon the web of the channel 120 betwen the upstanding flanges thereof. Connection between the piston rod 130 and the carriage 134 is made by a cam grip link 142, one end of which is pivotally embraced between the bifurcated ends 141 and 143 of a fitting 144 secured to the outer end of the piston rod 130 and pivoted intermediate its ends at 146 to the carriage 134. The grip link 142 has a portion extending beyond the pivot 146 and arranged to bear upon the top surface of the work sheet 124 and cam grip the same between such end and a horizontal shelf formed on the carriage 134 upon which the work sheet rests, as most clearly shown in Fig. 4. The carriage 136 is also provided with a roller 148 which rests and rolls upon the top surface of the work sheet 124 when the carriage is being retracted to take a new grip in its step-by-step feed motion.

The feed table is also provided with a frame 150 in spaced relation above the work sheet 124 which carries a plurality of horizontally spaced, parallel hold-down rollers 152 arranged to rest upon the top surface of the work sheet 124 to keep the sheet from buckling when pushed by the push feed mechanism.

Feed mechanism is also provided for pulling the workpiece or blank through the press and comprises a pair of horizontally disposed, pressure air operated cylinders 154 and 156 of light construction, mounted one at each side of the female die at the right-hand end thereof as viewed in Fig. 1.

As shown most clearly in Figs. 5 and 6, the outer ends of the piston rods 158 and 159 of the cylinders 154 and 156 respectively are provided with fittings 160 and 162 respectively in which are journaled oppositely extending, axially aligned trunnions 164 and 166 of a substantially rectangular frame, generally indicated at 168. The fittings 160 and 162 are held on their respective trunnions by washers 170 and 172 respectively which are secured to the ends of the trunnions by cap screws 174 and 176 respectively, threaded axially into their respective trunnions.

The inner faces of the fittings 160 and 162 are provided with plates welded thereto, each of which is provided with upstanding, angularly spaced gears or lugs 180 and 182 which are located in the paths of travel of bosses 184 and 186 respectively, welded to the opposite outer sides of the frame 168 so as to limit the rotation or oscillation of the frame about its trunnion mountings.

The frame 168 is in the nature of a hollow box construction with front and rear sides or faces which are provided with vertically elongated openings 188 and 190 through which the formed pipe blank may loosely pass when positioned substantially normal thereto, but which is cramped and gripped when at the angle shown in broken lines in Fig. 5. The frame 168 is also provided with a vertically disposed depending tongue 192 mounted between the front and rear sides thereof at the top of the opening therethrough and is provided with a depending end portion 194 having hardened sides and which projects into the pipe blank between the open seam edges for guiding and aligning the blank.

The upper die carrying plate 32 has a male die 196 mounted on the lower edge thereof by a plurality of bolts 198 which pass transversely through the plate 32 and through upstanding spaced parallel flanges 200 and 202 which are welded to the top side of the die.

As shown most clearly in Fig. 7 at the forward end of the male die, there is provided a second or upper female die 200 which is secured to the upper die plate 32 in the same manner as the male die 196. The female die 200 engages the top half of the partially formed pipe and curls the two edges inwardly so as to complete the circular forming of the pipe into substantially its final form.

As shown most clearly in Figs. 10 to 13 and Fig. 15, the female die 26 has a flat bottomed portion 202' bounded at its opposite edges by upwardly curved rim portions 204 and 206 which converge toward the small end of the die and have axes which are disposed at equal angles with respect to the longitudinal center line of the die. A portion 207 of the die at the smaller end thereof is completely semi-circular in cross section as indicated at 208. The bottom plate 202 and the curved side portions 204 and 206 are mounted on a relatively thick base plate 210, and the curved side portions 204 and 206 are braced by a plurality of vertically disposed longitudinally spaced gusset braces 212, which are welded to the side portions 204 and 206 and to the bottom plate 210.

Filler blocks 214 and 216 are interposed between the base plate 210 and the curved portions 204 and 206 as shown most clearly in Figs. 10 and 12 and vertically disposed brace plates 218 and 220 have their bottom edges welded to the base plate 210 and their upper edges welded to the top edges of the curved portions 204 and 206 as shown most clearly in Fig. 13.

The male die 196 is formed in a shape complementary to the female die 26. As shown most clearly in Fig. 7 of the drawings, the dies, as viewed in side elevation, are inclined downwardly at their entrance end for a distance substantially two-thirds of their length. At the point 222 there is a change of direction and from there to the discharge ends thereof, the dies are substantially horizontal with respect to the general plane of the machine.

In the operation of this pipe forming machine, the workpiece or blank 124 is fed from the table by the push cylinders 126 and 128 and the operation of these push feed cylinders is governed and controlled by the mechanism shown in detail in Fig. 14. The control mechanism for the push feed is mounted on the hydraulic jack at the end of the press adjacent to the work feed table, as shown in Fig. 7 of the drawings.

Figure 17:
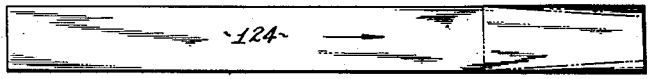
Fig. 17 is a view of a workpiece after its first engagement with the dies showing how the opposite marginal edges for a portion only of the length of the workpiece are curved in cross section along axes which converge equally to the longitudinal center line of the workpiece.
Figure 18:
Fig. 18 is a similar view after a successive operation of the dies.
Figure 19:
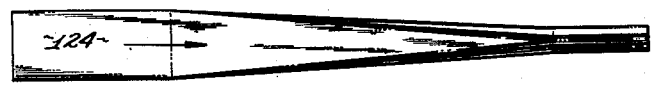
Fig. 19 is a similar view after further action of the dies.
Figure 20:
Fig. 20 is a similar view after still further action of the dies.

As the workpiece is fed into the press, the first closing thereof operates on a portion only of the blank as shown in Fig. 17 of the drawings. In this operation, the opposite marginal edges of the workpiece are curved for a short distance only with respect to the total overall length of the sheet of material 124. As the press is opened the push feed mechanism is automatically actuated to feed the workpiece or blank 124 a suitable increment into the press in longitudinal direction. At each successive closing of the press a further longitudinal portion of the workpiece is engaged by the dies as shown in Figs. 18, 19 and 20 until the substantially completely formed cylindrical pipe emerges from the opposite end of the die and passes through the openings 188 and 190 of the pull feed mechanism, as shown in dotted lines in Fig. 5 of the drawings.

The pull feed mechanism is automatically actuated by the hydraulic cylinder located adjacent the discharge end of the press and when the finished end of the pipe passes through the gripper, actuation of the gripper by the air cylinders 154 and 156 causes the gripper to tilt to the position shown in broken lines in Fig. 5 of the drawings thereby cramping or engaging the end of the pipe so as to pull the same through the machine.

If the pipe is being formed from a continuous strip or roll of sheet stock, the push feed mechanism and the pull feed mechanism supplement each other in drawing the pipe through the press. Where single sheets of stock are being worked upon, the length of the blank or stock is so arranged that the formed end of the pipe emerges from the press and is engaged by the pull feed mechanism before the rear end of the pipe passes from the grip carriages of the push feed mechanism.

However, if the press is not equipped with the pull feed mechanism, then it is customary to tack the individual sheets end to end by arc welding or the like so that the push feed mechanism will continue feeding the stock through the press. Best results, however, are obtained by using both the push feed and the pull feed mechanism so that one can supplement the other in feeding the stock through the press.

With respect to the operation of the pull feed mechanism shown particularly in Figs. 5 and 6 of the drawings, it will be noted that the trunnions which mount the frame 168 are mounted below the center thereof so that there is an unbalanced or topheavy condition to the frame 168. The ear 182 and its cooperating lug or boss 186 is so arranged that the frame is in a slanting or unbalanced position in normal operation, as when being retracted by its actuating cylinders. Immediately upon reverse movement of the actuating cylinders, the frame will tip to the position shown in broken lines of Fig. 5 of the drawings, whereupon the rounded formed end of the pipe is gripped by the upper and lower edges of the elongated openings in the frame and thereby a pull is exerted on the pipe which drags it through the press.

Although but one specific embodiment of this invention has been herein shown and described, it will be understood that numerous details of the construction shown may be altered or omitted without departing from the spirit of this invention as defined by the following claim.

I claim:

The method of forming a pipe from an elongated, substantially rectangular sheet of material, which includes the steps of: first bending only a longitudinal portion of only the lateral marginal edges of the sheet, the direction of bend being normal to the length of the sheet to produce arcuate curvatures cross sectionally of the sheet which are substantially the same curvature as that of the finished pipe while leaving transversely intermediate portions unbent, thereafter successively bending similar curvatures in additional longitudinal marginal portions of the sheet while simultaneously bending similar curvatures in immediately successive inwardly adjacent transverse portions of the sheet while maintaining the bent marginal edge portions and previously bent successive inwardly adjacent portions in their initially bent cross sectional curvature until the entire sheet has been cross sectionally curved to substantially the ultimate shape of the finished pipe.

References Cited in the file of this patent

UNITED STATES PATENTS

| Number | Name | Date |
|---|---|---|
| 224,382 | Blake | Feb. 10, 1880 |
| 324,198 | Wattie | Aug. 11, 1885 |
| 1,124,221 | Gillespie | Jan. 5, 1915 |
| 1,313,025 | Smith | Aug. 12, 1919 |
| 1,805,283 | Hammerstrom | May 12, 1931 |
| 1,906,987 | McDougal | May 2, 1933 |
| 2,177,545 | Wright | Oct. 24, 1935 |